United States Patent [19]
Rosa

[11] 3,838,330
[45] Sept. 24, 1974

[54] ARRANGEMENT AND METHOD FOR CONVERTING ELECTRICAL POWER WITHOUT EXTERNAL SUPPLY OF REACTIVE POWER REQUIREMENTS

[75] Inventor: John Rosa, Pittsburgh, Pa.

[73] Assignee: Westinghouse Electric Corporation, Pittsburgh, Pa.

[22] Filed: Apr. 13, 1973

[21] Appl. No.: 351,057

[52] U.S. Cl. .................................. 321/5, 321/27 R
[51] Int. Cl. ............................................ H02m 7/00
[58] Field of Search ..... 321/18, 27 R, 27 MS, 45 R, 321/47, 5

[56] References Cited
UNITED STATES PATENTS

| | | | |
|---|---|---|---|
| 3,308,368 | 3/1967 | Schmidt, Jr. | 321/27 R |
| 3,538,412 | 11/1970 | Graf et al. | 321/47 |
| 3,668,507 | 6/1972 | Kadomsky et al. | 321/27 R |
| 3,707,665 | 12/1972 | Gyugyi | 321/5 |
| 3,707,668 | 12/1972 | Johnston | 321/27 R |
| 3,716,775 | 2/1973 | Skogsholm | 321/5 |
| 3,750,004 | 7/1973 | Walker | 321/5 X |

Primary Examiner—William M. Shoop, Jr.
Attorney, Agent, or Firm—J. J. Wood

[57] ABSTRACT

In a system utlizing a naturally commutated converter to convert AC power to DC power (or to convert DC power to AC power), a force commutated converter is placed in parallel with the naturally commutated converter. The input power factor of the force commutated converter is set to compensate for the reactive power required by the naturally commutated converter. The input power factor of the force commutated converter is equal but of opposite sign with respect to the input power factor to the naturally commutated converter, which has an inherently lagging input power factor.

15 Claims, 7 Drawing Figures

PATENTED SEP 24 1974

3,838,330

ARRANGEMENT AND METHOD FOR CONVERTING ELECTRICAL POWER WITHOUT EXTERNAL SUPPLY OF REACTIVE POWER REQUIREMENTS

BACKGROUND OF THE INVENTION

1. Field of the Invention:

This invention relates generally to the conversion of electrical power for alternating current (AC) to direct current (DC) or from DC to AC, and more specifically, this invention relates to an arrangement for internally compensating for the reactive power required by the inherent lagging input power factor of a naturally commutated converter.

2. Description of the Prior Art:

Naturally commutated thyristor converters are extensively used to provide controllable DC power from AC supply lines or, operating in the "inversion" mode, to "regenerate" power from a DC source into the AC supply lines. As utilized herein, the term "conversion" shall be understood as referring to either or both the transformation of AC power into DC power or the transformation of DC power into AC power. This latter type of operation will usually be referred to as "inversion" for purposes of distinguishing the direction of conversion.

A controllable DC output voltage $V_{DC}$ is obtained by controlling the firing delay angle $\alpha$ of the converter. The DC output voltage obeys the following mathematical relationship:

$$V_{DC} = V_{DC\ max} \cos \alpha$$

where $V_{DC\ max}$ is the maximum DC voltage obtained at zero firing delay. For $0 \leq \alpha < 90°$, $V_{DC}$ is positive and power is flowing from the AC side of the converter to the DC side. For $90 < \alpha < 180°$, $V_{DC}$ is negative and the power is flowing from the DC side to the AC side (inversion).

Regardless of whether the conversion is from AC to DC or DC to AC, the AC supply lines must provide the reactive power inherent in the operation of the naturally commutated converter. Since the naturally commutated converter always has a lagging input power factor (i.e., the AC current lags the AC voltage by a phase angle $\alpha$), the AC supply lines always see a reactive load having a lagging power factor of approximately:

$$\cos \alpha = V_{DC}/V_{DC\ max}$$

$V_{DC}$ is the actual DC output voltage of a converter for a given firing delay $\alpha$, while $V_{DC\ max}$ is the DC output voltage for zero firing delay. In other words, the AC lines deliver (or regenerate) through the converter:

$$I_{DC}V_{DC}\ (KW)$$

but are themselves loaded:

$$I_{DC}V_{DC}/\cos\alpha = I_{DC}V_{DC\ max}\ (KVA)$$

In high power installations, this attaches a severe penalty, especially if the application requires prolonged operation at reduced DC output voltage ($V_{DC} < V_{DC\ max}$). Examples of such applications are the charging-/discharging of storage batteries for peak power handling, high voltage DC transmission, variable speed DC motor drives, and inversion of fuel cell power. To illustrate the problem for the latter application, it is realistically assumed that the fuel cell delivers rated power at 70 percent of maximum voltage (i.e., $V_{DC} = 0.7 V_{DC\ max}$ and $\cos \alpha = 0.7$, or $\alpha =$ approximately 45°). As a result, for each 1 KW of power delivered, the AC supply lines must absorb $1/0.7 = 1.43$ KVA or, to restore unity power factor, an adjustable, leading reactive power source of 1 KVAR maximum rating must be additionally installed.

In essence, this means that when AC power is converted to DC power, lagging reactive power must be externally supplied to the converter either by the AC lines or by an additional reactive power source. Similarly, when the conversion is from DC power to AC power (inversion), the lagging reactive power inherently required by the naturally commutated converter must be supplied externally of the converter. In either event, the external supply of reactive power, either from the AC lines or from an additional source, can be a significant drawback to optimum usage of a converter system.

SUMMARY OF THE INVENTION

Briefly, in order to obviate the disadvantages involved in the utilization of a naturally commutated converter, the present invention relates to an arrangement and method for converting electrical power without the necessity of externally supplying reactive power. This is achieved by placing a second converter circuit, such as a force commutated converter circuit, in parallel with a first converter circuit, such as a naturally commutated converter circuit. Both the first and second converter circuits utilize bistable switching devices, such as semiconductive thyristors. The thyristors could be any of a variety of devices, one example of a frequently utilized device being the silicon controlled rectifier (SCR).

A control scheme is utilized: (a) to cause the bistable switching devices of the naturally commutated converter to be appropriately fired at a delay angle $\alpha$ to obtain the desired DC output voltage $V_{DC} = V_{DC\ max} \cos \alpha$; and (b) to cause the bistable switching devices of the force commutated converter to be fired at a lead angle $-\alpha$. It can be shown that the firing of the bistable switching devices of a converter at a "lead" angle, rather than at the "delay" angle at which the bistable switching devices of the naturally commutated converter are inherently fired, results in the load seen by the AC supply lines displaying a leading, rather than a lagging, power factor, and that identical lag/lead angles result in identical DC output voltages, as indicated by the following mathematical relationship:

$$V_{DC\ nc} = V_{DC\ max} \cos \alpha = V_{DC\ max} \cos(-\alpha) = V_{DC\ fc}$$

and $$P_{R\ nc} = I_{DC\ nc}V_{DC\ max} \sin \alpha = -I_{DC\ nc}V_{DC\ max} \sin(-\alpha)$$
$$= -P_{R\ fc}$$

where $V_{DC\ nc}$ and $V_{DC\ fc}$ are the respective DC output voltages of the naturally commutated and the force commutated converters;

$P_{R\ nc}$ and $P_{R\ fc}$ are the respective reactive powers drawn by the naturally commutated and the force commutated converters (positive sign for lagging, negative sign for leading power factor);

$I_{DC\ nc}$ and $I_{DC\ fc}$ are the respective DC output currents of the naturally commutated and the force commutated converters. Since $V_{DC\ nc} = V_{DC\ fc}$ and the internal impedances of the two converters are supposed to be identical, it follows that $I_{DC\ nc} = I_{DC\ fc}$, that is, each converter carries an equal share of the DC output current and thus an equal share of the power converted.

Whether the converter is being utilized for conversion of AC power to DC power, or vice versa, the input power factor of the force commutated converter circuit will have a magnitude equal to the input power factor of the naturally commutated converter circuit, but leading in nature, rather than lagging. In other words, the current drawn by the force commutated converter circuit will have a leading phase angle equal to the lagging phase angle of the current drawn by the naturally commutated converter circuit. Since the two currents are equal in amplitude, the reactive power requirements of the naturally commutated converter and the force commutated converter will be equal and opposite, and hence will cancel each other, with the result that no external reactive power need be supplied.

The AC side of the converter, and hence the AC signal, may be single phase; but the AC signal would normally be polyphase, with the result that a multiplicity of AC supply lines will each have a voltage that is phase displaced from the voltages on the other AC lines. These phase displaced AC voltages are connected to one set of the AC terminals at both the naturally commutated converter and the force commutated converter. A DC signal is connected to appropriate terminals at both the naturally commutated and force commutated converters. The silicon controlled rectifiers of both converter circuits are connected across the DC lines in series with appropriate reactors. The naturally commutated converter circuit is arranged to be commutated by the line voltages, while the force commutated converter has the commutation of the SCRs thereof controlled by an appropriate control arrangement, such as an auxiliary commutating circuit. This auxiliary commutating circuit involves a pair of silicon controlled rectifiers connected across the naturally commutated converter and a pair of silicon controlled rectifiers connected across the force commutated converter, the direction of forward current flow through one pair of these SCRs being in the opposite direction to that through the other pair. An appropriate firing circuit provides gating signals for the SCRs in the auxiliary commutating circuit. Finally, a capacitor is connected between the midpoints of these pairs of SCRs to store a charge that will act to force the commutation of the SCRs in the force commutated converter.

With this arrangement, it is possible to utilize the system for conversion from AC to DC power or from DC to AC power without requiring any reactive power from the AC lines or any other source external to the converter system.

The foregoing and other objects, advantages and features of this invention will hereinafter appear, and for purposes of illustration, but not of limitation, an exemplary embodiment of the subject invention is shown in the appended drawing.

DETAILED DESCRIPTION OF THE PREFERRED EMBODIMENT

Figure 1:
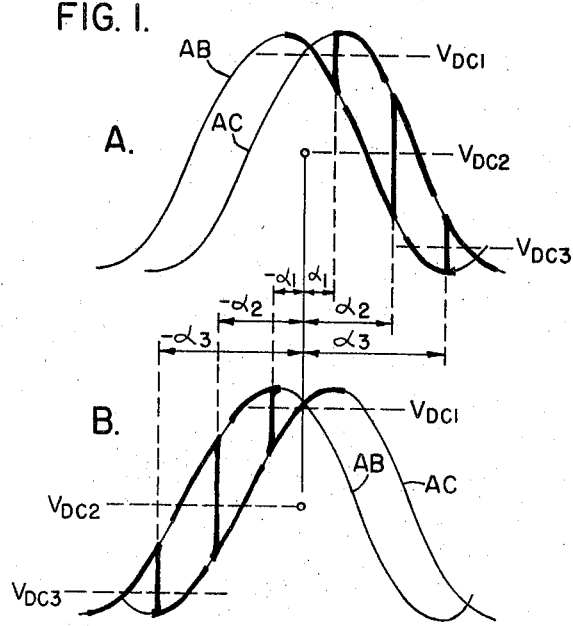
FIG. 1 is a schematic diagram indicating the relationship between firing delay angles and firing lead angles in converters.

FIG. 1 illustrates the result if the thyristors of a converter circuit are fired at various delay angles $\alpha_1$, $\alpha_2$ and $\alpha_3$ and lead angles $-\alpha_1$, $-\alpha_2$ and $-\alpha_3$, respectively. In waveform A of FIG. 1 (hereinafter all waveforms will be identified by figure number and waveform letter, e.g., 1A), the result of utilizing firing delay angles of these three magnitudes is illustrated. Similarly, in waveform 1B the result of utilizing lead angles of these three magnitudes is depicted. It may be seen that for equal delay and lead angles, the DC output voltages are equal. It will be further shown that while the power factors (phase angles) are also equal in magnitude, they are opposite in sign.

Referring first to waveform 1A, the effect upon a six pulse converter (i.e., six pulses per period are utilized to form the output wave, each pulse constituting 60° of the total period) of varying the delay angle may be seen. Waveform 1A represents two of the three alternating current line-to-line voltages (AB,AC) that form a segment of the DC output voltage $V_{DC}$. The alternating current line-to-line voltages are drawn with thin lines, the DC output voltage with heavy lines. For a firing delay angle of $\alpha_1$ (shown as 30°), a positive output DC voltage $V_{DC1}$ is obtained (i.e., alternating current power is converted to DC power).

Figure 3:
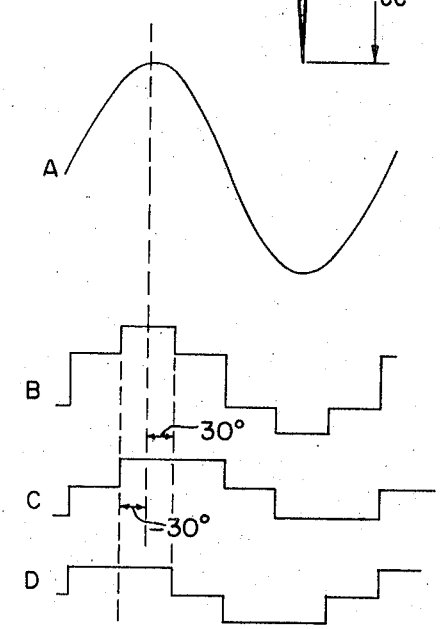
FIG. 3 is a series of schematic diagrams representing operation of the embodiment of FIG. 2 for AC to DC power conversion.

Looking now at waveform 1B, in utilizing a firing lead angle of $-\alpha_1$ (i.e., $-30°$), it may be seen that an identical DC voltage $V_{DC1}$ will be produced. The corresponding currents flowing in one of the three alternating current lines (line A), along with alternating current line-to-neutral voltage A are shown in FIG. 3. Waveform 3A shows line-to-neutral voltage A. Waveform 3C shows the AC current flowing in line A feeding the converter operating at $\alpha_1 = 30°$ firing delay angle. It can be seen that this current is lagging 30° behind voltage A and therefore represents a lagging power factor. Waveform 3D shows the AC current flowing in line A feeding the converter operating at $-\alpha_1$ ($-30°$) firing lead angle. It can be seen that this current is leading 30° ahead of a voltage A and therefore represents a leading power factor of magnitude equal to the lagging power factor. Waveform 3B shows the net AC current flowing in line A. This current is the sum of the two currents represented by waveforms 3C and 3D. It can be seen that the net AC current flowing in line A is in phase with the A line-to-neutral voltage and therefore represents unity power factors. Thus the two converters operated at identical firing delay/lead angles compensate each other's lagging/leading power factor with the net result that the power factor of the two complementary converters is unity and that no reactive power is drawn from the AC lines.

The same equivalency may be seen for firing delay angle $\alpha_2$ and firing lead angle $-\alpha_2$, as well as for firing delay angle $\alpha_3$ and firing lead angle $-\alpha_3$. For delay angle $\alpha_2$ and lead angle $-\alpha_2$, the generated DC voltage, $V_{DC2}$ is 0, and hence no real power is drawn. For delay angle $\alpha_3$ and lead angle $-\alpha_3$, a negative DC voltage $V_{DC3}$ is produced, resulting in the reversal of energy flow indicated by the negative potential that is produced (i.e., an inversion of DC power to AC power is produced).

Figure 2:
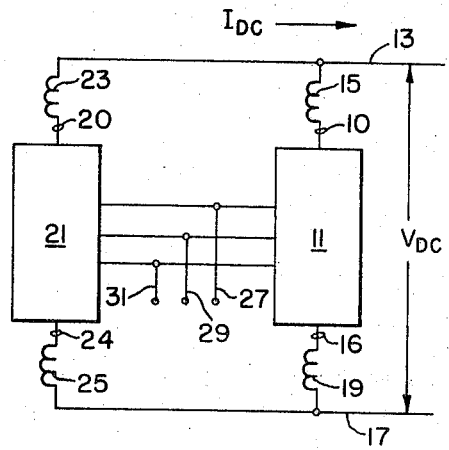
FIG. 2 is a schematic circuit diagram indicating a preferred embodiment of the present invention.

Utilizing the foregoing characteristics, it is possible to provide a converter system which will always have a unity input power factor when utilized to convert AC power to DC power, and which will never have to have reactive power provided to the converter system from an external source. An arrangement for achieving this result is illustrated in FIG. 2. In this preferred embodiment a DC terminal 10 of a first converter circuit 11 is connected to a DC line 13 through a reactor (inductor) 15, which may be an interphase reactor, although it need not be. A DC terminal 16 of converter circuit 11 is connected to a DC reference line 17 through a reactor (inductor) 19, which may also be an interphase reactor. In this preferred embodiment, converter circuit 11 is a naturally commutated converter (i.e., a converter in which the active elements are commutated as a result of line voltage differences), although other converter circuits could also be utilized.

A DC terminal 20 of a second converter circuit 21 is connected to DC line 13 through a reactor (inductor) 23, and a DC terminal 24 thereof is connected to DC reference line 17 through a reactor (inductor) 25. As in the use of reactors 15 and 19, these may be interphase reactors. Converter circuit 21 is any type of converter in which the commutation of the active devices may be controlled regardless of line voltage conditions, referred to generally hereinafter as a force commutated converter.

Reactors 15, 19, 23 and 25 are utilized to absorb the instantaneous voltage differences between the DC outputs of converters 11 and 21 and DC lines 13 and 17. These instantaneous differences occur as a result of the different wave portions utilized to construct the DC voltages at the outputs of the converters. Without the use of the reactors, these instantaneous voltage differences would produce an undue ripple in the DC output currents.

An AC line 27 is connected to both naturally commutated converter circuit 11 and force commutated converter circuit 21. The AC line 27 may carry a signal that is either a single phase voltage or one of a plurality of polyphase, or phase displaced voltages. In this particular embodiment, a three-phase AC arrangement is utilized, so that AC lines 29 and 31 are also connected to converters 11 and 21.

The relationship of the unity power factor conditions have been illustrated by considering FIG. 1 in connection with FIG. 3. It was shown that for a naturally commutated converter having a certain firing delay angle and for a force commutated converter having an equal firing lead angle, the line-to-line voltages will be used to produce equal DC voltages across the DC terminals 10–16 and 20–24 of both converters. At the same time, the currents drawn by the converters will have the same magnitudes and phase angles, except that the force commutated converter current's phase angle will be leading while that of the naturally commutated converter will be lagging. As a result, the net line currents will be in phase with the line-to-neutral voltages and the input power factor of the system will be unity.

Figure 4:
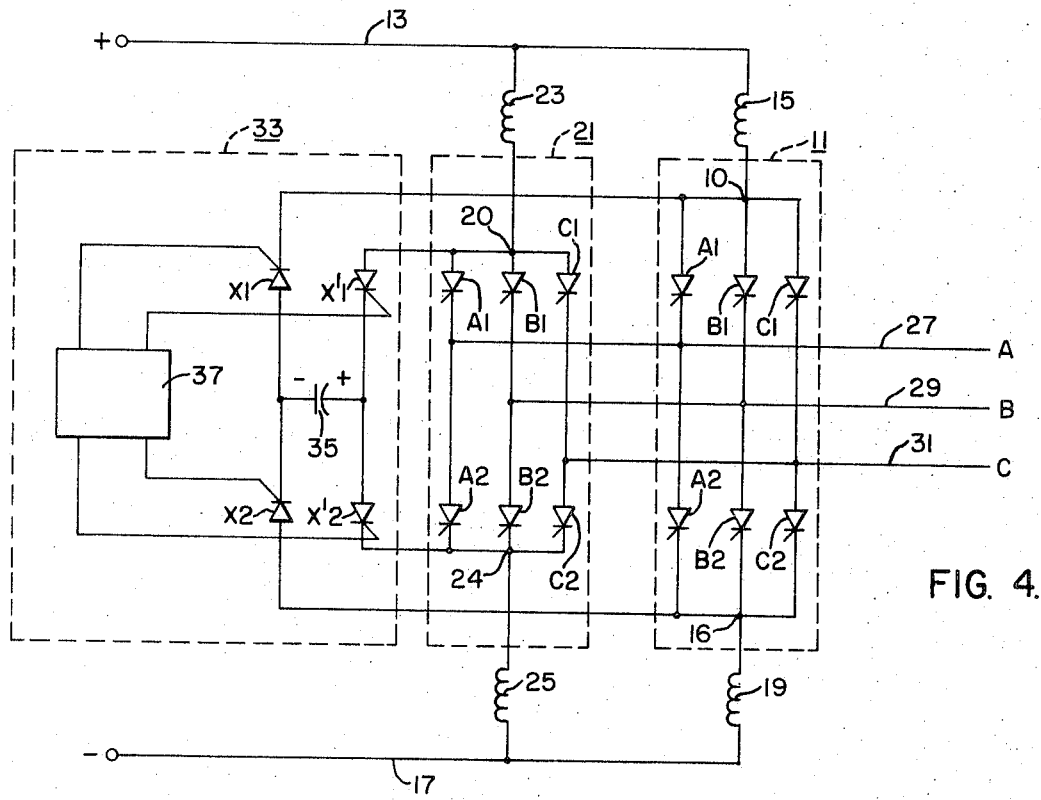
FIG. 4 is a more detailed circuit diagram of the embodiment of FIG. 2.

With reference now to FIG. 4, the preferred embodiment of FIG. 2 may be seen in greater detail. As may be seen, the voltages on lines 27, 29 and 31 have been identified as phases A, B and C, respectively. Naturally commutated converter 11 has three pairs of silicon controlled rectifiers A1-A2, B1-B2 and C1-C2. SCRs A1 and A2 are connected in series between reactors 15 and 19. The phase A voltage of line 27 is applied to the midpoint of the pair of SCRs A1-A2. An appropriate firing or gating arrangement (not shown) applies firing signals to each of the SCRs in the naturally commutated converter 11 in order to fire these SCRs and place them in a conducting state. Subsequently, these SCRs may be commutated from a conducting to a nonconducting state by the voltages appearing on lines 27, 29 and 31. (The firing or gating arrangement may be any of a number of conventional arrangements that are well known in the art and which is schematically represented by the firing or gating lead shown on each SCR. Examples of such firing or gating arrangements are discussed in the text by B. R. Pelly, entitled "Thyristor Phase — Controlled Converters and Cycloconverters," published in 1971 by Wiley-Interscience Division of John Wiley & Sons, Inc.)

In a similar fashion, the series connected pairs of SCRs B1-B2 and C1-C2 have the phase B voltage and the phase C voltage, respectively, conveyed to the midpoint thereof. Also, the firing or gating arrangement applies appropriate firing or gating signals to these SCRs, which may then be commutated by the line voltages.

Force commutated converter 21 is virtually identical to the naturally commutated converter 11, as it has pairs of SCRs A1-A2, B1-B2 and C1-C2, which are appropriately fired or gated for conduction. The SCRs of force commutated converter 21 are, however, connected between reactors 23 and 25, rather than reactors 15 and 19.

The force commutation of the SCRs in force commutated converter 21 is achieved by means of a control or auxiliary commutating circuit 33. Auxiliary commutating circuit 33 has two pairs of series connected SCRs X1-X2 and X'1-X'2. SCRs X1 and X2 are connected in series across naturally commutated converter 11, while SCRs X'1-X'2 are connected in series across force commutated converter 21. It should be noted that these pairs of SCRs are respectively connected in opposite conducting directions with respect to the DC terminals. A capacitor 35 is connected between the midpoints of the SCR pairs X1-X2 and X'1-X'2. An appropriate firing circuit 37 controls the firing or gating of SCRs X1, X2, X'1 and X'2. This firing circuit is generally conventional and may be any appropriate type of such a circuit that fires appropriate pairs of the SCRs X1-X'1 and X2-X'2 at times corresponding to the desired firing lead angle SCRs A1, B1 or C1 or A2, B2 or C2 (in force commutated converter 21), respectively.

Figure 6:
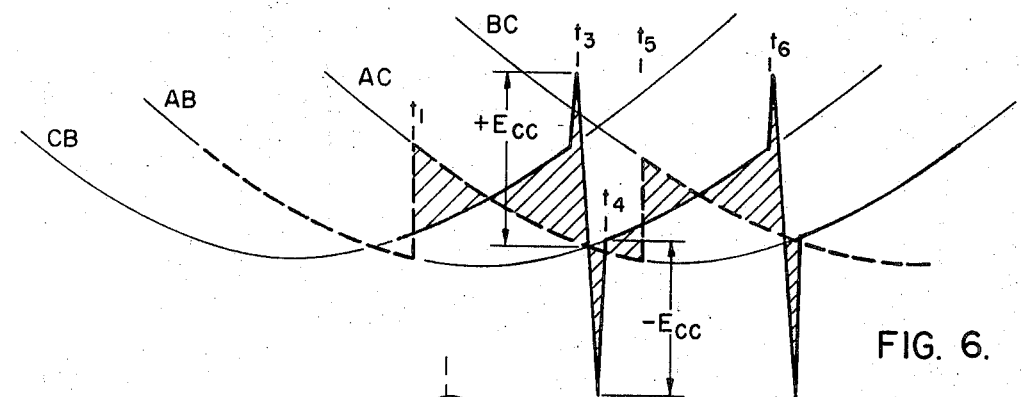
FIG. 6 is a schematic diagram providing an enlarged view illustrating instantaneous voltage conditions upon commutation.
Figure 5:
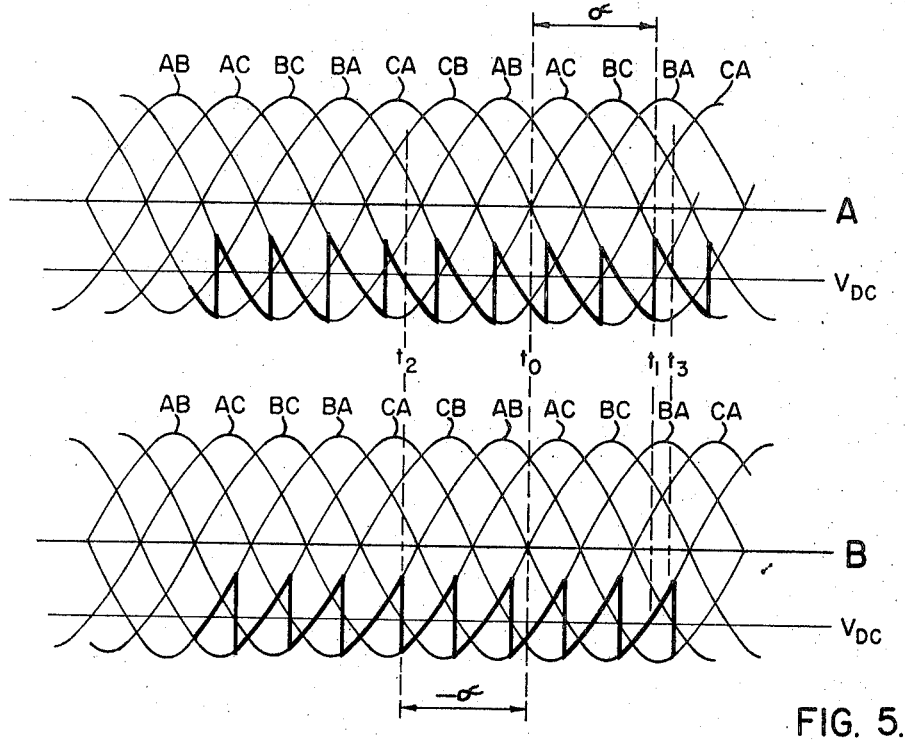
FIG. 5 is a series of schematic diagrams illustrating the operation of the embodiment of FIG. 4.

The operation of the circuit illustrated in FIG. 4 may be understood by reference to FIGS. 5 and 6. FIGS. 5 and 6 relate to the mode of operation for the inversion of DC power to AC power. Waveform 5A illustrates the DC voltage appearing across DC terminals 10 and 16 of naturally commutated converter circuit 11, while waveform 5B shows the DC voltage appearing across DC terminals 20 and 24 of force commutated converter circuit 21.

In the case illustrated, the converters are operating in the inversion mode and therefore are putting out a negative DC voltage (i.e., DC terminals 10 and 20 are negative with respect to DC terminals 16 and 24. The firing delay angle of the naturally commutated converter 11 is $\alpha=140°$ and the firing lead angle of the force commutated converter 21 is $-\alpha$ or $-140°$. The delay/lead angles are measured from the instance when two line voltages cross and nautral commutation from one to the other becomes possible. Referring to waveform 5A, it may be seen that, for instance, decreasing line voltage AB crosses increasing line voltage AC at time $t_0$; indicating that after $t_0$ the potential of line B becomes higher than that of line C. (As also indicated by line voltage BC crossing from negative to positive.) The natural commutation from SCR B1 to SCR C1 in converter 11 thus becomes possible by firing SCR C1. However, in order to obtain the desired negative output voltage necessary for operation in the inversion mode, firing of SCR C1 and thus commutation from B1 to C1 is delayed until time $t_1$, corresponding to delay angle $\alpha=140°$.

Inasmuch as force commutated converter 21 is arranged to produce a leading power factor of the same magnitude as the lagging power factor of naturally commutated converter 11, it should mean that the foregoing transfer of operation from voltage AB to voltage AC (i.e., the commutation from phase B to phase C) should occur in advance of time $t_0$ by equal but leading angular displacement $-\alpha$ or $-140°$. As indicated by waveform 5B, commutation from SCR B1 to SCR C1 of force commutated converter 21 at time $t_2$ corresponds to a commutation lead angle of $-\alpha$. Since, however, at time $t_2$ the potential of line B is still lower than that of line C, the firing of SCR C1 would not result in the natural commutation from B1 to C1. To effect commutation, auxiliary commutating circuit 33 must be used.

A more detailed understanding of the operation of the circuit upon commutation, especially the action of auxiliary commutating circuit 33, may be obtained from FIG. 6. In FIG. 6, it has been assumed that the conditions prevailing at the beginning of the illustrated time period are those that were previously described for a time immediately preceding $t_1$ in FIG. 5. With these prevailing conditions, SCRs C2 and B1 are conducting in force commutated converter 21 and the DC output voltage across terminals 20 and 24 of force commutated converter 21 is formed by alternating current voltage CB. In naturally commutated converter 11 SCRs A2 and B1 are conducting and the DC output voltage across terminals 10 and 16 of naturally commutated converter 11 is formed by alternating current voltage AB. In FIG. 6, the voltage appearing across terminals 10 and 16 of the naturally commutated converter 11 is illustrated by the heavy dashed line, while the voltage appearing across terminals 20 and 24 of the force commutated converter 21 is illustrated by the heavy solid line. At time $t_1$, corresponding to firing delay angle $\alpha$, SCR C1 is fired resulting in the natural commutation from SCR B1 to C1 of converter 11. SCR A2 stays in conduction. As a result of this commutation, the voltage appearing across naturally commutated converter 11 is now AC. At time $t_3$, it is desired to have force commutated converter 21 transfer from voltage CB to AB to provide the proper leading power factor. To accomplish this, conduction must be commutated (transferred) from SCR C2 to SCR A2. Since, however, the potential of line A is more negative than that of B, it is not possible to naturally commutate from SCR C2 to SCR A2 in converter circuit 21. To achieve this commutation, firing circuit 37 fires SCRs X2 and X'2 at time $t_3$. This creates a discharge path for capacitor 35 through SCR X'2, SCR C2 in converter 21, line 31, line 27, SCR A2 in converter 11, and SCR X2. (The result, as depicted in FIG. 6, is to cause an instantaneous increase of the voltage between terminals 20 and 24 of converter 21.) By choosing the voltage $E_{CC}$ across capacitor 35 to be greater than the line-to-line voltage CA, SCR C2 of converter 21 will be reverse biased at time $t_3$. The current previously flowing in line 31 through SCR C2 of converter 21 ceases to flow and the current drawn by reactor 25 is now flowing through capacitor 35. This current flow will cause capacitor 35 to discharge and then become charged in the opposite direction to the potential $-E_{CC}$, as shown in FIG. 6. As a result, SCR A2 becomes forward biased and by now firing SCR A2 in converter 21 at time $t_4$, it will become conductive while the charge on capacitor 35 will turn off SCRs X2 and X'2 and complete the force commutation cycle. Capacitor 35 is now charged with a voltage $-E_{CC}$ which will be utilized to commutate from SCR B1 to SCR C1 in converter 21 by firing SCRs X1 and X'1 at the appropriate time $t_6$, after a natural commutation at time $t_5$ from SCR A2 to SCR B2 in converter 11.

As a result of the forced commutation at time $t_3$, the voltage appearing between DC terminals 20 and 24 of force commutated converter 21 went from CB to AB, as desired. The instantaneous voltage differences between the voltages apperaing between terminals 10 and 16 of converter 11 and terminals 20 and 24 of converter 21 is illustrated by the cross hatched area in FIG. 6. These instantaneous voltages must be absorbed by the reactors 15, 19, 23 and 25.

It should be understood that various modifications, changes and variations may be made in the arrangements, operations and details of construction of the elements disclosed herein without departing from the spirit and scope of the present invention.

Figure 7:
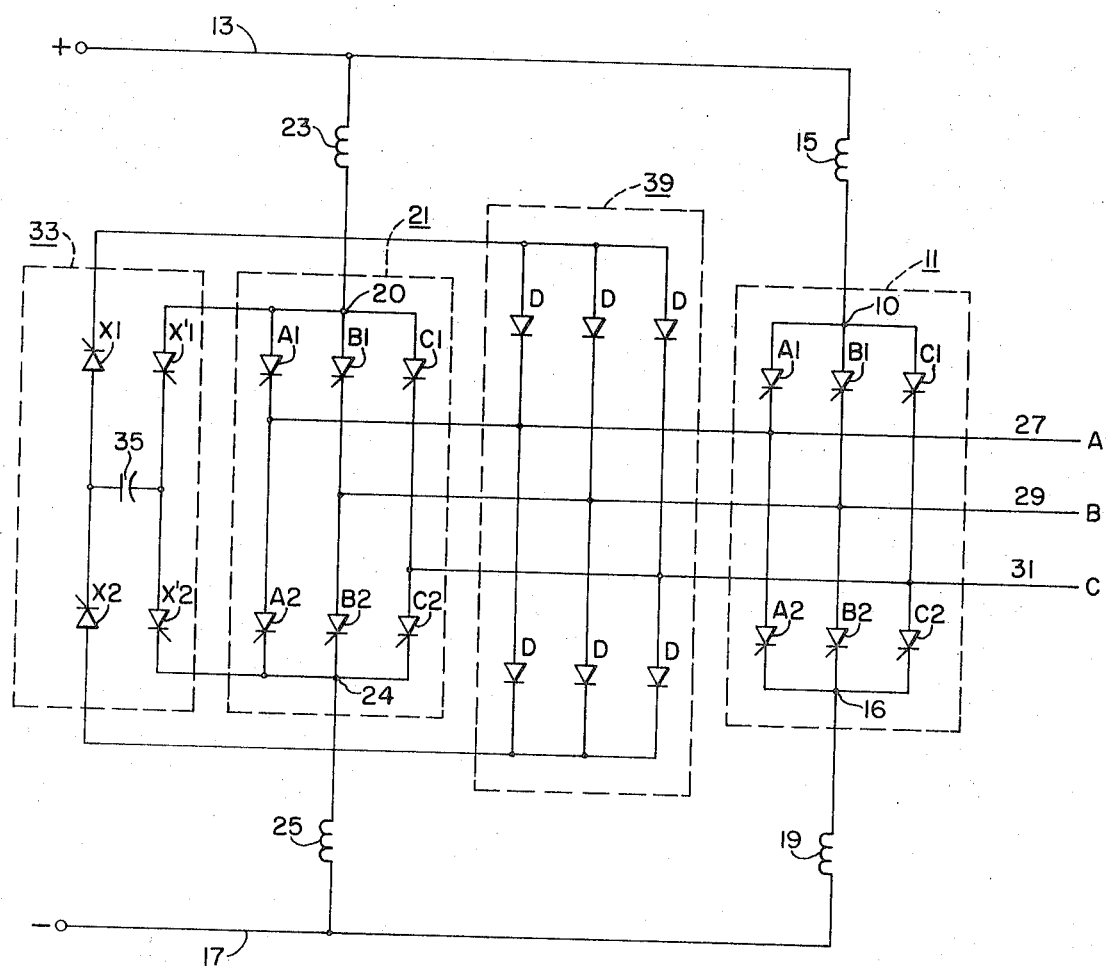
FIG. 7 is a schematic diagram of a modified version of the preferred embodiment of this invention.

One such modification is shown in FIG. 7. In this circuit, auxiliary commutation circuit 33 is again connected to force commutated converter 21, as in the configuration shown in FIG. 4. The other terminals of auxiliary circuit 33 however are connected to diode rectifier bridge 39, rather than to naturally commutated converter 11, and force commutation of the SCRs of converter 21 is effected via the diodes D of bridge 39. By use of diode bridge 39, the ratings of the SCRs in the naturally commutated converter 11 may be reduced, as these SCRs do not then need to carry the current of force commutated converter 21 during commutation of the SCRs in converter 21. Without bridge 39, the SCRs of converter 11 have to carry both their own current and that of converter 21 for a short period, hence the necessity of SCRs having a greater current carrying capacity.

What is claimed is:

1. An arrangement for converting electrical power without the necessity for externally supplying reactive power comprising:

a naturally commutated converter circuit to convert an input signal to a desired output signal, one of said input and output signals being a direct current signal and the other being an alternating current signal, said naturally commutated converter circuit drawing an alternating current having an inherently lagging phase angle representative of a reactive power component;

a force commutated converter circuit to convert an input signal to a desired output signal, one of said input and output signals being a direct current signal and the other being an alternating current signal, the input signal of said naturally commutated converter circuit corresponding to the input signal of said force commutated converter circuit, and the output signal of said naturally commutated converter circuit corresponding to the output signal of said force commutated converter circuit; and control means for force commutating said force commutated circuit, at appropriate times, to cause said force commutated converter circuit to draw an alternating current having a phase angle and amplitude such that when it is combined with the current drawn by said naturally commutated converter circuit there is no need to supply external reactive power.

2. An arrangement as claimed in claim 1 wherein:
said input signals of said converter circuits are alternating current signals;
said output signals of said converter circuits are direct current signals; and
said control means causes said force commutated converter circuit to draw a current having an amplitude and a leading phase angle of the same magnitude as the amplitude and lagging phase angle of the current drawn by said naturally commutated converter circuit.

3. An arrangement as claimed in claim 1 wherein:
said input signals of said converter circuits are direct current signals;
said output signals of said converter circuits are alternating current signals; and
said control means causes said force commutated converter circuit to draw a current having an amplitude and a leading phase angle of the same magnitude as the amplitude and lagging phase angle of the current drawn by said naturally commutated converter circuit.

4. An arrangement for converting electrical power without the necessity for externally supplying reactive power comprising:
a naturally commutated converter circuit having an alternating current terminal and a direct current terminal the current at its alternating current terminal having an inherent lagging phase angle;
a force commutated converter circuit having an alternating current terminal and a direct current terminal, said alternating current terminals of said naturally commutated and force commutated converter circuits having a common reference and being connected together, and said direct current terminals of said naturally commutated and force commutated converter circuits having a common reference and being connected together; and
control means to force commutate said force commutated converter circuit to produce a current at its alternating current terminal that has a phase angle and amplitude such that, when the currents at said alternating current terminals of said naturally commutated and force commutated converter circuits are combined, the resultant current satisfies the reactive power requirements of the arrangement.

5. An arrangement as claimed in claim 4 wherein both said naturally commutated converter circuit and said force commutated circuit have a plurality of alternating current terminals corresponding to a plurality of phase displaced electrical voltages.

6. An arrangement as claimed in claim 5 wherein:
said naturally commutated converter circuit comprises a plurality of bistable switching devices related in number to the number of phase displaced electrical voltages and connected between a pair of direct current lines, one of said direct current lines being connected to said direct current terminal of said naturally commutated converter circuit;
said force commutated converter circuit comprises a plurality of bistable switching devices related in number to the number of phase displaced electrical voltages and connected between a pair of direct current lines, one of said direct current lines being connected to said direct current terminal of said force commutated converter circuit;
and
a plurality of alternating current lines corresponding to the number of phase displaced electrical voltages are connected to said alternating current terminals of said converter circuits, each of said alternating current lines being connected to a predetermined side of a bistable switching device in said naturally commutated converter circuit and the same side of a bistable switching device in said force commutated converter circuit, each of said bistable switching devices having only one of said alternating current lines connected thereto.

7. An arrangement as claimed in claim 6 wherein said control means comprises:
a first pair of bistable switching devices connected in series between said direct current lines of said naturally commutated converter circuit and oriented to convey current in a predetermined direction with respect to said direct current terminal thereof;

a second pair of bistable switching devices connected in series between said direct current lines of said force commutated converter circuit and oriented to convey current in a predetermined direction with respect to said direct current terminal thereof, said first pair of bistable switching devices conveying current in a different direction with respect to said direct current terminal of said naturally commutated converter circuit than the direction said second pair of bistable switching devices conveys current with respect to said direct current terminal of said force commutated converter circuit;
a capacitor connected between the midpoints of said first and second pairs of bistable switching devices;

and
firing means to actuate selected ones of the bistable switching devices in said first and second pairs of bistable switching devices at appropriate times.

8. An arrangement as claimed in claim 7 and further comprising reactors interconnecting said direct current terminals of said naturally commutated converter circuit and said force commutated converter circuit.

9. An arrangement as claimed in claim 7 wherein:
the bistable switches in said first and second pairs of stable switches comprise silicon controlled rectifiers; and
said firing means is connected to the gate terminals of said silicon controlled rectifiers.

10. An arrangement as claimed in claim 5 wherein:

said naturally commutated converter circuit comprises three pairs of bistable switching devices, each of said pairs of bistable switching devices connected in series between a pair of direct current lines, one of said direct current lines being connected to said direct current terminal of said naturally commutated converter circuit;
said force commutated converter circuit comprises three pairs of bistable switching devices, each of said pairs of bistable switching devices connected in series between a pair of direct current lines, one of said direct current lines being connected to said direct current terminal of said force commutated converter circuit; and
three alternating current lines are connected to said alternating current terminals of said converter circuits, each of said alternating current lines being connected to the midpoint of one of said pairs of bistable switching devices in said naturally commutated converter circuit and to the midpoint of one of said pairs of bistable switching devices in said force commutated converter circuit, each of said pairs of bistable switching devices having only one of said alternating current lines connected to the midpoint thereof.

11. An arrangement as claimed in claim 10 wherein said control means comprises:
a first pair of bistable switching devices connected in series between said direct current lines of said naturally commutated converter circuit and oriented to convey current in a predetermined direction with respect to said direct current terminal thereof;

a second pair of bistable switching devices connected in series between said direct current lines of said force commutated converter circuit and oriented to convey current in a predetermined direction with respect to said direct terminal thereof, said first pair of bistable switching devices conveying current in a different direction with respect to said direct current terminal of said naturally commutated converter circuit than the direction said second pair of bistable switching devices conveys current with respect to said direct current terminal of said force commutated converter circuit;
a capacitor connected between the midpoints of said first and second pairs of bistable switching devices;

and
firing means to actuate selected ones of the bistable switching devices in said first and second pairs of bistable switching devices at appropriate times.

12. An arrangement as claimed in claim 11 wherein all of the bistable switching devices comprise thyristors.

13. An arrangement as claimed in claim 12 wherein:

said thyristors comprise silicon controlled rectifiers; and
said firing means is connected to the gate terminals of said silicon controlled rectifiers.

14. An arrangement as claimed in claim 13 and further comprising interphase reactors interconnecting said direct current terminals of said converter circuits to eliminate the ripple resulting from transitory voltage differences between said converter circuits.

15. A method of converting electrical power without the necessity of externally supplying power requirements comprising:
converting the applied signal by means of a naturally commutated converter circuit to give a desired output signal that supplies half of the real power requirements of the load, the naturally commutated converter circuit drawing a current having a lagging phase angle;
converting the applied signal by means of a force commutated converter circuit to give a desired output signal that supplies half of the real power requirements of the load; and
controlling the force commutated converter circuit to draw a current having a phase angle and magnitude such as to negate the need to provide external reactive power when combined with the alternating current of the naturally commutated converter circuit.

* * * * *